United States Patent
Takeda

(10) Patent No.: US 6,265,961 B1
(45) Date of Patent: Jul. 24, 2001

(54) THERMAL PROTECTOR

(75) Inventor: Hideaki Takeda, Misato (JP)

(73) Assignee: Uchiya Thermostat Co., Ltd., Saitama-Ken (JP)

( * ) Notice: Subject to any disclaimer, the term of this patent is extended or adjusted under 35 U.S.C. 154(b) by 0 days.

(21) Appl. No.: 09/265,985

(22) Filed: Mar. 11, 1999

(30) Foreign Application Priority Data

Mar. 13, 1998 (JP) .................................................. 10-062658

(51) Int. Cl.[7] ........................ H01H 37/52; H01H 37/54; H01H 37/60; H01H 37/72
(52) U.S. Cl. ........................ 337/333; 337/343; 337/380; 337/53
(58) Field of Search ...................... 337/398, 333, 337/343, 380, 381, 16, 20, 26, 27, 36, 53, 109, 112; 29/622

(56) References Cited

U.S. PATENT DOCUMENTS

| | | | |
|---|---|---|---|
| 2,486,341 | * 10/1949 | Stumbock | 75/232 |
| 3,223,808 | * 12/1965 | Wehl | 337/360 |
| 3,443,259 | * 5/1969 | Wehl et al. | 337/89 |
| 4,157,525 | * 6/1979 | Grable | 337/343 |
| 4,349,585 | * 9/1982 | Nagashima et al. | 427/125 |
| 4,374,311 | * 2/1983 | Okahashi et al. | 200/269 |
| 4,490,704 | * 12/1984 | Snider et al. | 337/372 |
| 4,503,131 | * 3/1985 | Baudrand | 428/672 |
| 4,672,353 | * 6/1987 | Ubukata et al. | 337/368 |
| 4,894,634 | * 1/1990 | Nezuka et al. | 337/343 |
| 5,268,664 | * 12/1993 | Givier | 337/380 |
| 5,337,036 | * 8/1994 | Kuczynski | 337/343 |
| 5,428,336 | * 6/1995 | Smith et al. | 337/365 |
| 5,804,798 | 9/1998 | Takeda . | |
| 5,847,637 | 12/1998 | Takeda et al. . | |

FOREIGN PATENT DOCUMENTS

| | | |
|---|---|---|
| 3319227C2 | 3/1988 | (DE) . |
| 19521913A | 1/1996 | (DE) . |
| 60-39541 U | 3/1985 | (JP) . |
| 193019 | 4/1989 | (JP) . |
| 334169 | 5/1991 | (JP) . |
| 334169 B2 | 5/1991 | (JP) . |
| 472336 | 11/1992 | (JP) . |
| 6119859 | 4/1994 | (JP) . |
| 822757 | 1/1996 | (JP) . |
| 8161989 | 6/1996 | (JP) . |
| 9120766A | 5/1997 | (JP) . |

* cited by examiner

*Primary Examiner*—Leo P. Picard
*Assistant Examiner*—Anatoly Vortman

(57) ABSTRACT

A thermal conductor includes a fixing plate which ha a fixing contact at one end and the other end of which is connected to an external circuit via a first terminal. There is a movable plate which has a movable contact contactable with the fixing contact at one end and the other end of which is connected to an external circuit via a second terminal, also included is a bimetal plate which is deformed when the temperature thereof is increased to a preset predetermined value, thereby deforming the movable plate in the direction such that the movable contact is separated from the fixing contact. The Internal conductive parts (e.g. the fixing and movable plates) are formed of a material having an electrical conductivity of 50%IACS and higher.

8 Claims, 2 Drawing Sheets

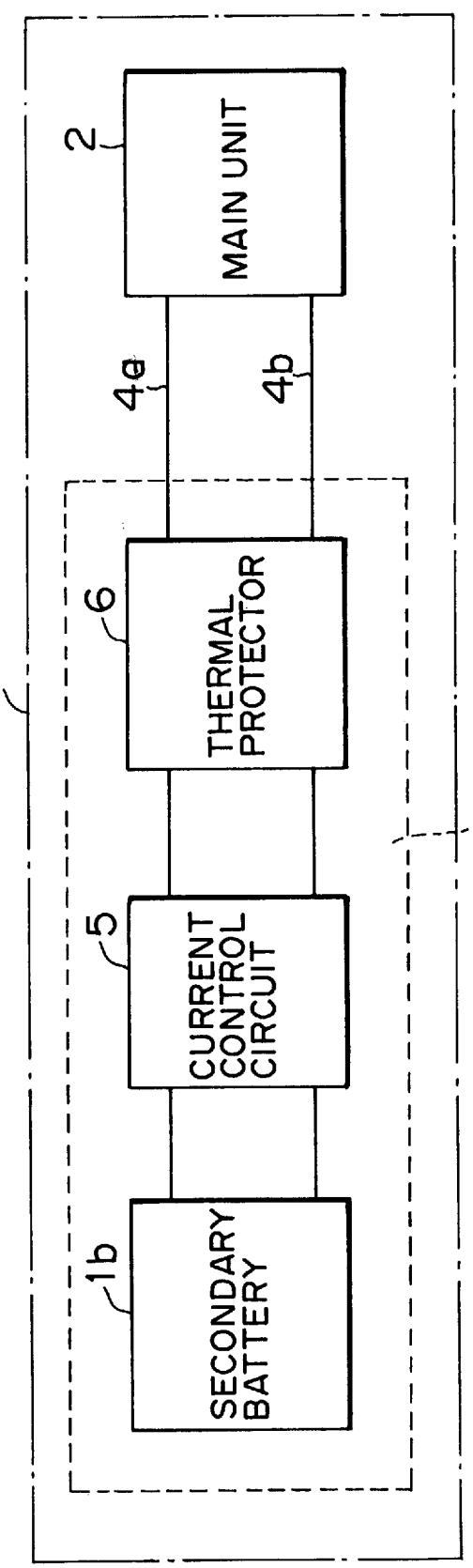
FIG. 3
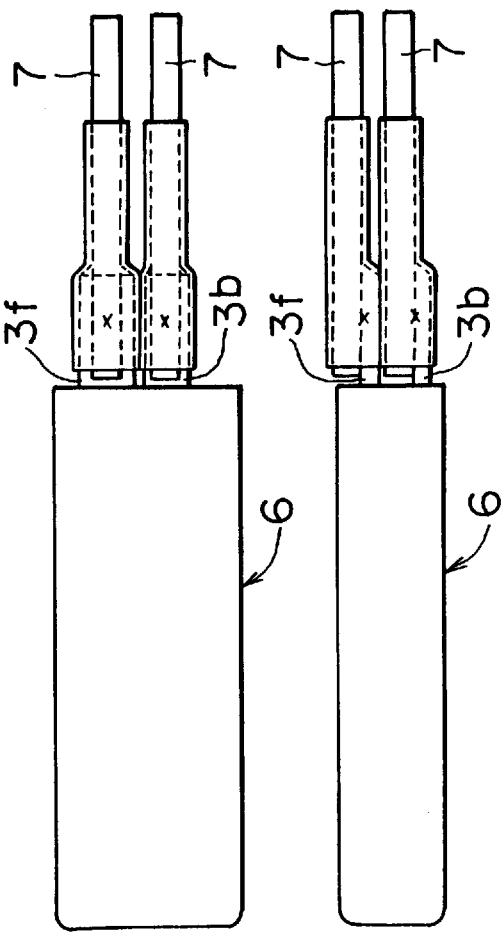
FIG. 4a
FIG. 4b

THERMAL PROTECTOR

FIELD OF THE INVENTION AND RELATED ART STATEMENT

The present invention relates to a thermal protector and, more particularly, to a thermal protector suitably used for a secondary battery pack incorporated in a portable computer such as a notebook personal computer.

As shown in FIG. 1, a notebook personal computer comprises of a main unit 2 and a secondary battery pack BP-1. The main unit 2 has a CPU and memories etc, that is, performs fundamental function as a computer. The secondary battery pack BP-1 incorporates a secondary battery 1a and a thermal protector 3. The thermal protector 3 is interposed between the secondary battery 1a and the main unit 2. This thermal protector 3 operates when an excess current is allowed to flow by a short circuit of a load of the battery 1a or when the battery 1a runs hot and becomes in an overheating state due to a large discharge current, performing a function of electrically isolating the main unit 2 from the secondary battery 1a.

FIG. 2 is a sectional view of the thermal protector 3. The construction and operation of a thermal protector of this type have been disclosed in, for example, Japanese Patent Provisional Publication No. 6-119859 (No. 119859/1994) and Japanese Patent Provisional Publication No. 8-161989 (No. 161989/1996).

Referring to FIG. 2, a fixing plate 3a consisting of a good electric conductor is formed with a first outside terminal 3b connected to an external circuit at one end and is provided with a fixing contact 3c at the other end. A movable plate 3d, which is a good electric conductor and is made of an elastic material, is provided with a movable contact contactable with the fixing contact 3c at one end and is fitted with a second outside terminal 3f at the other end. The fixing plate 3a and the movable plate 3d are insulated from each other by an electrical insulating member 3g.

The movable plate 3d holds a bimetal plate 3h on the upper side thereof so that the bimetal plate 3h can be deformed inversely. The insulating member 3g fixing the fixing plate 3a, movable plate 3d, bimetal plate 3h, and outside terminal 3f to each other by penetrating holes formed in these elements.

The bimetal plate 3h takes an upwardly convex shape as shown in FIG. 2 when its temperature is lower than a predetermined value. At this time, the movable contact 3e is in contact with the fixing contact 3c. When the temperature of the bimetal plate 3h becomes higher than the predetermined value, the bimetal 3h is instantly deformed inversely so as to take a downwardly convex shape. The bimetal 3h having such a property is referred to as a snap-action type bimetal plate.

The distal end of the bimetal plate 3h engages with the movable plate 3d via a claw 3i provided at the distal end of the movable plate 3d. Therefore, if the bimetal plate 3h is deformed so as to be downwardly convex, the movable plate 3d is deformed in the direction so as to go away from the fixing plate 3a by the deformation force. As a result, the movable contact 3e is separated from the fixing contact 3c.

The aforementioned thermal protector 3 is provided on at least one of conductors 4a and 4b connecting the main unit 2 to the secondary battery 1a.

In the state shown in FIG. 2, in which the bimetal plate 3h is not inversely deformed, electric current flows in the order of the first outside terminal 3b, fixing plate 3a, fixing contact 3c, movable contact 3e, movable plate 3d, and second outside terminal 3f, or in the order reverse to this. On the other hand, if the bimetal plate 3h is inversely deformed and the movable contact 3e is separated from the fixing contact 3c, the main unit 2 is electrically isolated from the secondary battery 1a.

Conventionally, a nickel-cadmium battery or a nickel-hydrogen battery has been used as the aforementioned secondary battery 1a. These secondary batteries must be protected from an excess current caused by a short circuit. For this reason, the thermal protector 3 is required to operate in response to th e excess current. For the conventional thermal protector 3, therefore, in order to provide a proper internal resistance, the outside terminals 3b and 3f, fixing plate 3a, and movable plate 3d are formed of a material having an electrical conductivity of about 20%IACS (for example, brass). The term IACS is an acronym for International Annealed Copper Standard, and %IACS means a percentage of electrical conductivity with respect to a standard annealed Cu wire.

According to the thermal protector 3 in which the conductive parts thereof are formed of the aforementioned material, when an excess current flows into the secondary battery due to a short circuit etc. of load, the bimetal plate 3h is inversely deformed by the self heating action due to the internal resistance. Thus, by the opening action of the contacts 3c and 3e caused by the inverse deformation of the bimetal plate 3h, the secondary battery 1a can be released from the short-circuit state.

For the secondary battery, the aforementioned nickel-cadmium battery or a nickel-hydrogen battery has recently been replaced with a lithium-ion battery. This lithium-ion battery requires precise charging/discharging control. Therefore, a control circuit using a semiconductor carries out control including protection against a short circuit.

However, from the viewpoint of safety, it is preferable to provide a safety device of a different type. For this reason, even for a battery pack using the aforementioned lithium battery, the thermal protector has often been used. On the other hand, as the performance of the portable computer is rapidly improved, the necessary current amount tends to increase.

Thereupon, the thermal protector used for such a battery pack requires low sensitivity to electric current in contrast with the conventional thermal protector. Specifically, it is important to decrease the operation sensitivity due to self heating, in other words, to increase the current which can be allowed to flow in an inoperative state (hereinafter referred to as inoperative current).

OBJECT AND SUMMARY OF THE INVENTION

The present invention has been made in view of the above situation, and an object thereof is to provide a thermal protector capable of allowing a high current to flow in an inoperative state.

The above object has been achieved by a thermal protector described in the present disclosure. That is, it has been achieved by preparing conductive parts such as a fixing plate and a movable plate by using a material having an electrical conductivity of 50%IACS and higher.

In order to achieve the object of the present invention, it is necessary that the temperature should not be increased even if a current flows. For this purpose, it is first necessary that the electrical resistance of the movable plate arranged near a bimetal plate be decreased, thereby reducing the self heating amount due to the current flowing in the movable plate.

However, to further decrease the temperature rise of the bimetal plate, it is also essential to rapidly discharge the heat generated even slightly in the movable plate to the outside.

In the present invention, the efficiency of heat discharge is improved by preparing the conductive parts, such as the fixing plate, which are not arranged near the bimetal plate, by using a material having a high thermal conductivity.

Generally, in a metal, free electrons govern the electrical conductivity and thermal conductivity, and Wiedemann-Franz law holds that the ratio of the thermal conductivity to the electrical conductivity is constant. Therefore, by using a material having a high electrical conductivity, a high thermal conductivity can be obtained.

In the present invention, a thermal protector in which the heat generated in the thermal protector is small in amount, the discharge efficiency of generated heat is high, and the inoperative current at room temperature is 12 A and higher has been realized by using a material having an electrical conductivity of 50%IACS and higher.

According to the present invention, the inoperative current can be doubled as compared with the conventional thermal protector without increasing the shape. Therefore, a battery having a higher capacity can be used.

BRIEF DESCRIPTION OF THE DRAWINGS

FIG. 3 is a block diagram showing a relationship between a secondary battery pack including a thermal protector in accordance with the present invention and a main unit; and FIGS. 4($a$) and 4($b$) are outside views of preferred embodiments of a thermal protector in accordance with the present invention, in which a copper wire is connected to an outside terminal.

DETAILED DESCRIPTION OF PREFERRED EMBODIMENTS

In FIG. 3, a battery pack BP-2, having a secondary battery $1b$ consisting of a lithium-ion battery, a current control circuit 5, and a thermal protector in accordance with the present invention, is disposed in a personal computer 1.

The current control circuit 5, formed by using a semiconductor, is provided for the control of charging/discharging of the secondary battery $1b$, the protection against a short circuit, and the like.

The thermal protector 6 is interposed on at least one of conductors $4a$ and $4b$ connecting a main unit 2 to the current control circuit 5. The thermal protector 6 may be interposed between the secondary battery $1b$ and the current control circuit 5. The main unit 2 has a CPU and memories etc.

Figure 1:
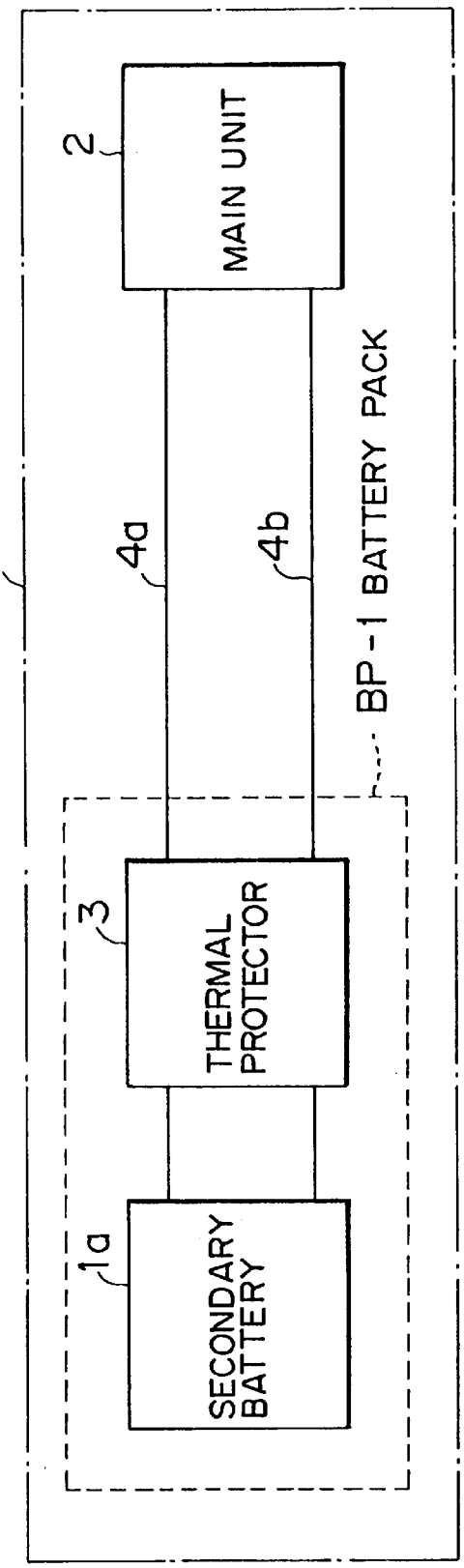
FIG. 1 is a block diagram showing a relationship between a secondary battery pack including a conventional thermal protector and a main unit.
Figure 2:
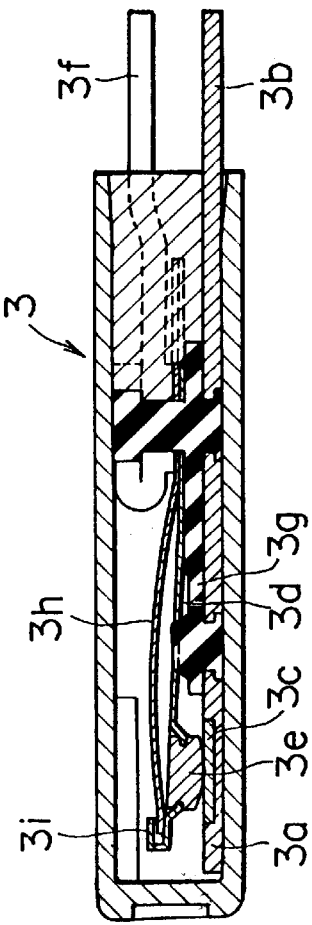
FIG. 2 is a sectional view showing a construction of a conventional thermal protector.

The construction itself of the thermal protector 6 is the same as that of the conventional thermal protector 3 shown in FIG. 2. However, this thermal protector 6 differs from the conventional thermal protector in the material of conductive parts etc.

Specifically, although conventionally the movable plate $3d$ shown in FIG. 2 has been formed of a material having an electrical conductivity of about 20%IACS, the thermal protector 6 of this embodiment has the movable plate $3d$ formed of a material having an electrical conductivity of 50%IACS and higher (for example, beryllium copper 11 alloy). Also, although conventionally the fixing plate $3a$ including the first outside terminal $3b$ and the second outside terminal $3f$ have been formed of brass, the thermal protector 6 of this emtbodiment has the fixing plate $3a$ and the outside terminal $3f$ formed of copper (the electrical conductivity thereof is, for example, about 98%IACS and higher).

FIGS. 4($a$) and 4($b$) illustrates lead wires 7 connecting to the outside terminals $3b$ and $3f$. Although conventionally a nickel ribbon cable has been used as the lead wire, the thermal protector 6 of this embodiment uses a copper wire with a diameter of 0.8 mm. Thereby, the amount of heat generation is further decreased, and the thermal conductivity is improved.

For the conventional thermal protector, the electrical resistance between the outside terminals $3b$ and $3f$ is about 6.5 mΩ, and the magnitude of inoperative current is about 6.5 A at room temperature and about 3.5 A at 60° C.

Contrarily, according to the thermal protector 6 in accordance with the present invention, in which the movable plate $3d$, fixing plate $3a$, and outside terminals $3b$ and $3f$ are formed of the aforementioned material, the electrical resistance between the outside terminals $3b$ and $3f$ decreases to 2.5 mΩ and lower, so that the inoperative current is 12 A and higher at room temperature and 7 A and higher at 60° C. It is preferable that the electrical resistance between the terminals $3b$ and $3f$ be decreased to 3 mΩ and lower.

Thus, since the thermal protector 6 in accordance with the present invention has a high inoperative current, even if a current two times or more of that of the conventional protector is allowed to flow, heat high enough for the bimetal $3h$ to be inversely deformed is not produced. Therefore, it is suitable as a thermal protector used for a high-capacity battery pack PB with a high load current.

When the current control circuit 5 using a semiconductor becomes in trouble, or when the load current of the secondary battery $1b$ exceeds the controllable range of the current control circuit 5, the temperature of the bimetal plate $3h$ exceeds the predetermined value, so that the thermal protector 6 is operated. As a result, the main unit 2 is electrically isolated from the secondary battery $11a$.

Since the thermal protector 6 in accordance with the present invention has a low sensitivity to electric current, it is preferable that the electrical insulating member be formed of a thermosetting resin to protect the electrical insulating member from a thermal adverse effect due to excessive current.

What is claimed is:

1. A thermal protector comprising:
   a fixing plate defining an internal conductive part, which has a fixing contact at one end and the other end of which is connected to an external circuit via a first terminal;
   a movable plate, defining an internal conductive part, which has a movable contact contactable with said fixing contact at one end and the other end of which is connected to an external circuit via a second terminal; and
   a bimetal plate which is inversely deformed when the temperature thereof is increased to a preset predetermined value, thereby deforming said movable plate in the direction such that said movable contact is separated from said fixing contact, wherein the internal conductive parts are formed of a material having an electrical conductivity of 50%IACS and higher.

2. The thermal protector according to claim 1, wherein said first and second terminals are formed of copper.

3. The thermal protector according to claim 1, wherein the electrical resistance between said first and second terminals is 3 mΩ and lower.

4. The thermal protector according to claim 1, wherein the material of conductive part is selected so that the inoperative current is 7 A and higher at 60° C.

5. The thermal protector according to claim 1, wherein an internal electrical insulating member is formed of a thermosetting resin.

6. The thermal protector according to claim 1, wherein a lead wire connected to said first and second terminals is a copper wire with a diameter of 0.8 mm and larger.

7. A thermal protector comprising:

a fixing plate defining an internal conductive part, which has a fixing contact at one end and the other end of which is connected to an external circuit via a first terminal;

a movable plate, defining an internal conductive part, which has a movable contact contactable with said fixing contact at one end and the other end of which is connected to an external circuit via a second terminal; and a bimetal plate which is inversely deformed when the temperature thereof is increased to a preset predetermined value, thereby deforming said movable plate in the direction such that said movable contact is separated from said fixing contact, characterized in that wherein the internal conductive parts are formed of a material having an electrical conductivity of 50%IACS and higher, so that the thermal detector is capable of allowing a high current to flow in an inoperative state.

8. The thermal projector according to claim 1, wherein the movable plate has an electrical conductivity of at least 50%IACS and the fixing plate has an electrical conductivity of about 98%IACS and higher.

* * * * *